United States Patent [19]

Troxel

[11] 4,229,881
[45] Oct. 28, 1980

[54] PLIERS TYPE CUTTING TOOL AND THE LIKE

[76] Inventor: Ronald L. Troxel, 51 Bergen Ave., Sewell, N.J. 08080

[21] Appl. No.: 16,920

[22] Filed: Mar. 2, 1979

[51] Int. Cl.³ .............................................. B26B 13/06
[52] U.S. Cl. ...................................................... 30/254
[58] Field of Search ............................ 30/254, 92, 233

[56] References Cited
U.S. PATENT DOCUMENTS

| | | | |
|---|---|---|---|
| 2,794,250 | 6/1957 | Bethune | 30/254 |
| 3,461,555 | 8/1969 | Bliznak | 30/254 |
| 4,026,018 | 5/1977 | Byberg | 30/254 |
| 4,050,152 | 9/1977 | Olson | 30/254 |
| 4,055,891 | 11/1977 | Wick | 30/92 |

*Primary Examiner*—Jimmy C. Peters
*Attorney, Agent, or Firm*—Robert K. Youtie

[57] ABSTRACT

A cutting tool including pivoted crossing arms provided with scissors-like cutting jaws each including a cutting edge portion extending radially inwardly and laterally outwardly for shearing engagement with an interposed work piece while urging the work piece radially inwardly toward the pivot.

1 Claim, 4 Drawing Figures

PLIERS TYPE CUTTING TOOL AND THE LIKE

BACKGROUND OF THE INVENTION

While the field of pliers like cutting tools is well developed, certain difficulties persist in such tools as are adapted for cutting cables, wires, and the like. For example, certain problems remain in providing such cutting tools for manual operation which may be small in size for economy and ease of handling, while serving to cut a wide size range of cable and wire. Another problem existent in presently known wire and cable cutters, as well as generally scissors type shears, is that of reasonable size tools accommodating to larger work pieces without tending to expel the work pieces and therefore requiring additional manipulation to hold the work pieces between the shearing members.

Representative of the closest prior art known to applicant are the following U.S. Pat. Nos. 336,867; 627,711; 835,912; 838,298; 858,003; 1,025,542; 1,195,591; 2,502,582; and 3,193,926.

SUMMARY OF THE INVENTION

Accordingly, it is an important object of the present invention to provide a uniquely improved pliers type cutting tool or cutter for wire, cable, and the like which overcomes the above mentioned difficulties, achieves a high degree of mechanical advantage by locating the final cutting edge portions proximate to the lever pivotal connection; presents distal jaw edges to an interposed work piece which edges converge radially outwardly of the tool to urge the work piece radially inwardly for effective retention of the work piece during cutting and displacement of the work piece toward the proximate cutting edge portions.

It is another object of the present invention to provide a cutting tool having the advantageous characteristics mentioned in the preceding paragraph, wherein the proximate cutting edges are arcuately concave to effectively circumferentially surround and engage a work piece for most effective cutting with minimum effort.

It is still another object of the present invention to provide a cutting tool having the advantageous characteristics mentioned hereinbefore, which is extremely simple in construction for economy in manufacture, and effectively achieves the above desired advantageous results by operation in the conventional manner so as to require no special training or skill.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENTS

Figure 1:
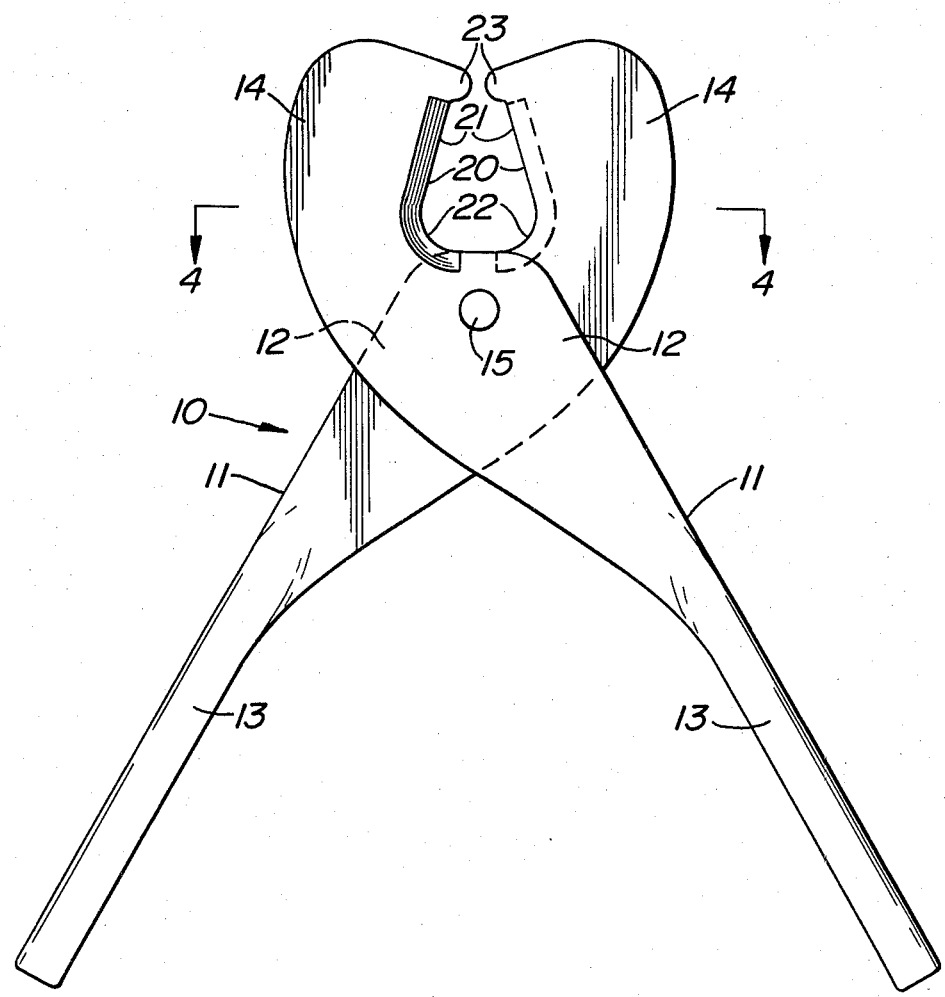
FIG. 1 is a plan view showing a cutting tool of the present invention in an open condition for receiving a work piece.

Referring now more particularly to the drawings, and specifically to FIG. 1 thereof, a cutting tool of the present invention is there generally designated 10, and may include a pair of substantially identical levers 11, which are arranged in crossing and inverted relation with respect to each other.

More particularly, each lever 11 includes an intermediate portion 12, and the intermediate lever portions are disposed in overlying crossing relation with respect to each other. Extending from each intermediate lever portion 12 is an elongate arm, handle or gripping portion 13, which portions extend generally in the same direction, downwardly as seen in FIG. 1, and may be suitable contoured, say for squeezing together by the hand of a user.

Extending from each intermediate portion 12, generally oppositely with respect to its handle or gripping portion 13 is a jaw or head portion 14. Thus, the jaws or heads 14 of both levers 11 extend in generally the same direction, upwardly as seen in FIG. 1. The intermediate or crossing regions 12 are connected together, by suitable pivot means, such as a pin 15 extending transversely through both intermediate portions.

Figure 4:
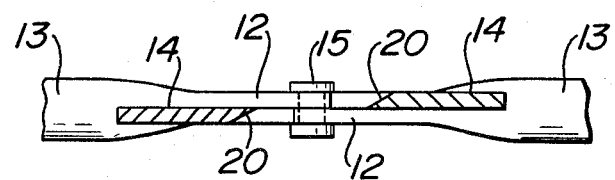
FIG. 4 is a transverse sectional view taken generally along the line 4—4 of FIG. 1.

The hand grip portions or handles 13 may be relatively wide, as seen in FIG. 4, for convenient manual grasping, while the overlying intermediate or crossing regions 12 may be of lesser thickness. Also, the jaws 14 may be of a thickness generally corresponding to that of the crossing regions 12 for sliding movement relative to each other into and out of an overlying relation, as will appear more fully hereinafter.

The jaws 14 may be of substantial width, as seen in FIG. 1, to achieve desired strength and are provided with laterally inner edges 20 disposed in facing spaced relation with respect to each other when the handles 13 are swung apart, as in FIG. 1. Thus, FIG. 1 illustrates an open tool condition, as prior to receiving a work piece to be cut. The outer end of each laterally inner jaw edge 20 is provided with a nub, projection or protuberance 23, which project generally laterally inwardly toward each other in the open position shown in FIG. 1, while being offset to lie in the planes of their respective jaws. From each radially outermost protuberance or nub 23, the associated laterally inner edge 20 includes a radially outer or distal edge portion 21, which may be substantially straight, and disposed to extend radially inwardly and obliquely laterally outwardly. Further, a proximate edge portion 22 of each laterally inner edge 20 extends continuously generally radially inwardly from the inner end of each distal edge portion 21 and is arcuately concave, with the concavities of proximate edge portions 22 generally facing each other. The distal and proximate edge portions 21 and 22 of each inner edge 20 may be beveled, or otherwise suitably configured to provide a cutting edge, such as may be seen in FIG. 4. That is, the inner edges 20 are slidable past each other upon closing movement of the jaws 14 into overlying relation, so that a work piece interposed between the jaw edges 20 is effectively severed by shearing.

Figure 2:
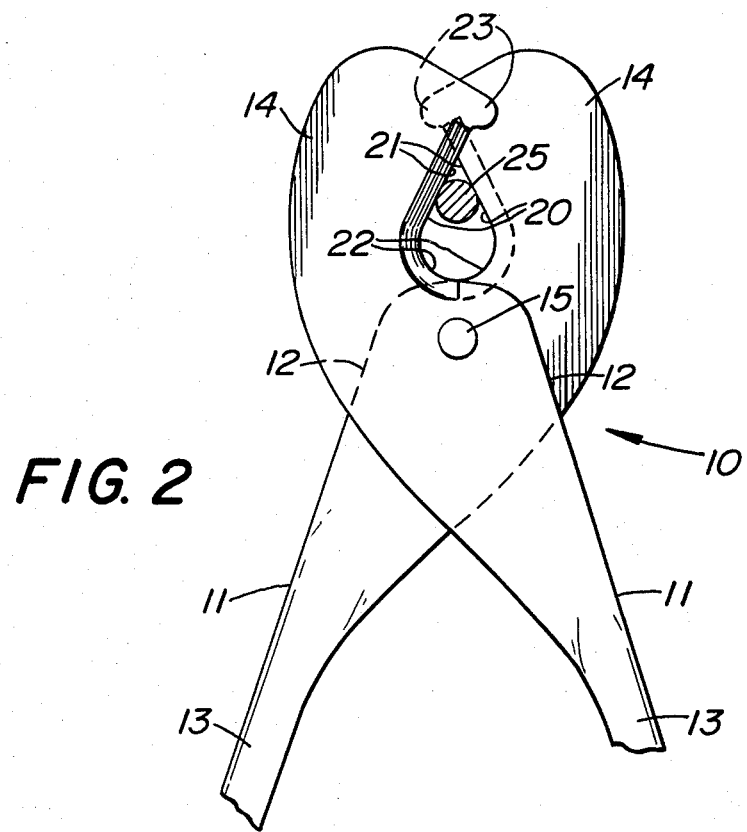
FIG. 2 is a partial plan view similar to FIG. 1, but illustrating an intermediate condition of operation having just received a work piece.

More particularly, with the tool 10 of FIG. 1 in the open condition there illustrated, a work piece may be inserted between the inner cutting edges 20, and the jaws 14 moved sufficiently toward each other so that the nubs or protuberances 23 leave therebetween insufficient space for removal therethrough of a received work piece. Upon further closure of the arms 13, and consequently of the jaws 14, the distal edge portions 21 swing into partially overlying relation, and combine to define therebetween an acute angle, best seen in FIG. 2. The acute angle will be observed to open or face toward the pivot 15. With a work piece, cable or wire 25 interposed between the distal edge portions 21, the angular formation thereof serves to urge the work piece radially inwardly of the tool toward the pivot 15. That is, in the initial position of FIG. 1 the inwardly projecting nubs 23 effectively retain a work piece between the jaws 14; and upon further closure of the jaws and an initial shearing action, the oblique distal edge portions 21 insure retention of the work piece, and further urge the work piece inwardly toward the pivot 15.

Figure 3:
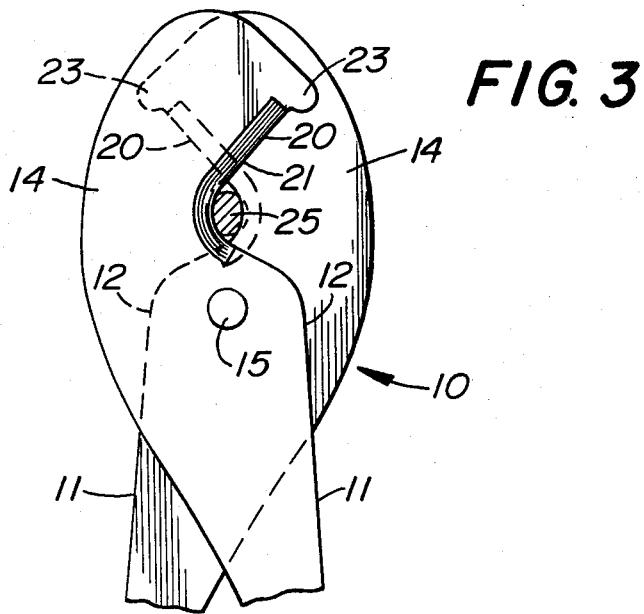
FIG. 3 is a plan view similar to FIGS. 1 and 2 but showing a later stage in operation with a work piece being sheared.

The further closing of tool 10 to the position of FIG. 3 illustrates the work piece 25 in its fully inward position toward pivot 15, specifically being substantially encompassed within and between the concavely arcuate proximate cutting edge portions 22. In this manner, maximum tool cutting edge is applied to the work piece, while the work piece is prevented from removal from between the cutting edges, and further is held at a location proximate to the pivot 15 for maximum mechanical advantage. Of course, slight further movement of jaws 14 toward each other into fully overlying relation will completely shear the work piece 25.

From the foregoing, it will now be appreciated that there is provided by the instant invention a pliers type cutting tool which is quickly and easily effective to sever cable, wire and the like of a wide range of sizes, insuring easy severance without loss of the work from between the cutting jaws and achieving a maximum cutting force, all by mere manual squeezing of the tool hand grips in a well known manner.

Although the present invention has been described in some detail by way of illustration and example for purposes of clarity of understanding, it is understood that certain changes and modifications may be made within the spirit of the invention.

What is claimed is:

1. A pliers-type cutting tool for cutting cable and the like, said tool comprising a pair of crossing levers, pivot means connecting said levers together at their crossing regions, manual gripping arms extending from one pair of lever ends for movement of said arms toward and away from each other, and cutting jaws on the other pair of lever ends and movable into and out of overlying relation, said cutting jaws including laterally inner edges movable slidably past each other upon said jaw movement to effect shearing action, said laterally inner edges each including a substantially straight distal portion extending from a radially outer point generally radially inwardly and obliquely laterally outwardly of the respective jaw to combine with each other in defining an included angle facing toward said pivot means, for urging an intermediate work piece toward said pivot means, said laterally inner edges each including an arcuately concave proximate portion extending continuously from each distal portion generally radially and laterally inwardly from a respective distal portion, said proximate portions combining to capture an interposed work piece and shear the latter, and a nub on each of said laterally inner jaw edges located radially outwardly of said radially outer point and projecting generally toward each other normal to said distal edge portions, for retaining relation with a work piece before said jaws move into said overlying relation.

* * * * *